US010110879B2

(12) United States Patent
Tian et al.

(10) Patent No.: US 10,110,879 B2
(45) Date of Patent: Oct. 23, 2018

(54) CALIBRATION METHOD FOR TELECENTRIC IMAGING 3D SHAPE MEASUREMENT SYSTEM

(71) Applicant: SHENZHEN UNIVERSITY, Shenzhen, Guangdong Province (CN)

(72) Inventors: Jindong Tian, Shenzhen (CN); Dong Li, Shenzhen (CN); Sichen Yan, Shenzhen (CN); Yong Tian, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 297 days.

(21) Appl. No.: 15/052,489

(22) Filed: Feb. 24, 2016

(65) Prior Publication Data

US 2016/0261851 A1    Sep. 8, 2016

(30) Foreign Application Priority Data

Mar. 5, 2015  (CN) .......................... 2015 1 0098471

(51) Int. Cl.
*H04N 13/246* (2018.01)
*H04N 13/236* (2018.01)
(Continued)

(52) U.S. Cl.
CPC ....... *H04N 13/246* (2018.05); *G01B 11/2504* (2013.01); *G01B 11/254* (2013.01);
(Continued)

(58) Field of Classification Search
CPC ... G01B 11/2504; G01B 11/254; G06T 7/521; G06T 7/80; H04N 13/0235; H04N 13/0246; H04N 13/0253; H04N 13/0296
See application file for complete search history.

(56) References Cited

U.S. PATENT DOCUMENTS 5,365,051 A * 11/1994 Suzuki .................. G03F 9/7003
250/201.2
2003/0038933 A1* 2/2003 Shirley .................. G01B 11/25
356/243.1
(Continued)

OTHER PUBLICATIONS

Li et al.; Structured light system calibration method with optimal fringe angle; Nov. 2014; Iowa State University; Applied Optics ; vol. 53, No. 33.*
(Continued)

*Primary Examiner* — Peter D Le
(74) *Attorney, Agent, or Firm* — Hauptman Ham, LLP

(57) ABSTRACT

A calibration method is described for a telecentric imaging 3D shape measurement system, including step S1: establishing a telecentric 3D shape measurement system; S2: controlling a telecentric projection equipment to project a sinusoidal fringe pattern to a translation stage, and collecting the sinusoidal fringe pattern by a telecentric camera equipment; moving the translation stage to different depth, then obtaining absolute phase values of a pixel for calibration by a phase-shifting method; and conducting linear fitting on the series of absolute phase values of the pixel and the corresponding depths to obtain a phase-depth conversion of the measurement system; and S3: transforming pixel coordinates on the image plane of the telecentric camera equipment into world coordinates through calibrating parameters of the telecentric camera equipment. A relationship between phase and depth herein is linear, and only needs to calibrate the linearity of one pixel. Therefore, the phase-depth calibration is of small complexity, high precision, good operability and strong practical applicability. Moreover, an orthographic transformation model of camera with bilateral telecentric lens is provided, which simplifies the calibration process.

2 Claims, 5 Drawing Sheets

(51) Int. Cl.
  *H04N 13/254* (2018.01)
  *H04N 13/296* (2018.01)
  *G01B 11/25* (2006.01)
  *G06T 7/80* (2017.01)
  *G06T 7/521* (2017.01)
(52) U.S. Cl.
  CPC ............ *G06T 7/521* (2017.01); *G06T 7/80* (2017.01); *H04N 13/236* (2018.05); *H04N 13/254* (2018.05); *H04N 13/296* (2018.05)

(56) References Cited

U.S. PATENT DOCUMENTS

| | | | | |
|---|---|---|---|---|
| 2005/0046873 A1* | 3/2005 | Suzuki | ............... | G01B 11/2527 356/605 |
| 2007/0115484 A1* | 5/2007 | Huang | ............... | G01B 11/2527 356/604 |
| 2012/0148145 A1* | 6/2012 | Liu | ................... | G06K 9/209 382/154 |
| 2013/0308199 A1* | 11/2013 | Shiue | ................ | G02B 13/22 359/663 |
| 2014/0002610 A1* | 1/2014 | Xi | ...................... | G01B 11/2513 348/46 |
| 2014/0132761 A1* | 5/2014 | Shih | ................... | H04N 7/18 348/142 |
| 2014/0253929 A1* | 9/2014 | Huang | ................ | G01B 11/245 356/611 |
| 2015/0138565 A1* | 5/2015 | Nagahashi | ......... | G01B 11/2504 356/610 |
| 2015/0260509 A1* | 9/2015 | Kofman | ............ | G01B 11/2504 356/601 |

OTHER PUBLICATIONS

Peng; Algorithms and Models for 3-D Shape Measurement using digital fringe projections; 2006; University of Maryland, College Park; pp. 1-266.*

* cited by examiner

S21: In case that a translation stage being in the common depth of field of a telecentric projector equipment and a telecentric camera equipment, adjusting the translation stage up and down so that the translation stage is located at a lowest position of a depth measurement range, and recording a lowest depth of the translation stage

S22: Controlling the telecentric projector equipment to project four sinusoidal fringe patterns with equal phase difference to the translation stage, and sequentially collecting the sinusoidal fringe patterns by the telecentric camera equipment; selecting a pixel for calibration, and calculating absolute phase values of the pixel for calibration using a four-step phase-shifting method

S23: In case that a translation stage being in the common depth of field of a telecentric projector equipment and a telecentric camera equipment, moving the translation stage, so that the translation stage is located at series of different depths; and calculating different absolute phase values of the pixel (u,v) on an image plane of the camera using the four-step phase-shifting method in step S22 when the translation stage is at different depths

S24: Conducting linear fitting on multiple groups of data obtained in step S23 to obtain a relation expression between the absolute phase values and the depths in a telecentric imaging 3D shape measurement system

Fig. 3

S31: Placing a calibration target on a translation stage to collect a calibration target image, and obtaining world coordinates of a series of feature points and their corresponding series of pixel coordinates in the imaging plane of a telecentric camera equipment S32: Calibrating the telecentric camera equipment by using the world coordinates and the pixel coordinates of the feature points, and transforming the pixel coordinates on the imaging plane of the telecentric camera equipment into the world coordinates

Fig. 6

S321: Obtaining an initial value of an external parameter of a telecentric camera equipment using a relation between word coordinates and image coordinates (not considering lens distortion) of a series of feature points S322: Considering the lens distortion of the telecentric camera equipment, and use a relation between word coordinates and the image coordinates of the series of feature points to obtain precise internal and external parameters of the telecentric camera equipment through a least squares method S323: Establishing a correspondence between a pixel on an imaging plane of the telecentric camera equipment and a world coordinate

Fig. 7

CALIBRATION METHOD FOR TELECENTRIC IMAGING 3D SHAPE MEASUREMENT SYSTEM

TECHNICAL FIELD

The present invention belongs to the field of 3D digital imaging and optical 3D reconstruction, and more particularly, it refers to a calibration method for a telecentric imaging 3D shape measurement system.

BACKGROUND

In 3D shape measurement systems, ones based on projecting sinusoidal fringe patterns, including phase detection profilometry and Fourier transform profilometry, are widely used due to their advantages such as simple principle, fast calculating speed, and high measuring accuracy. Through projecting sinusoidal fringe pattern to a reference plane by a projector, an original fringe pattern may be obtained. When an object to be detected is placed on the reference plane, a deformed fringe pattern may be obtained. Then a 2D absolute phase difference may be obtained through two fringe patterns, so as to obtain the 3D depth information of the object to be measured. Therefore, a phase-depth conversion and camera parameters of the measurement system need to be calibrated. But in a conventional monocular 3D shape measurement system, the periods of sinusoidal fringes on the reference plane are not fixed because of the projector and camera's non-linearity, which is caused by using common lenses. Therefore, someone proposes to use software programming to produce uneven sinusoidal fringes on a digital micro mirror of the projector, thus to project fringes with fixed periods in the measuring volume of the system. Someone else comes up with using defocusing technique, so that a binary structure fringe pattern generates an ideal sinusoidal fringe pattern. However, the system calibration process is complicated for every method above, and some parameters are very difficult to calibrate precisely, such as the distance from an optical center of a camera lens to the reference plane, the angle between an optical axis of the projector and an optical axis of the camera, and the like. While it is the calibration accuracy that determines the precision of any 3D shape measurement system.

SUMMARY

The present invention is to solve technical problems in the prior parts by providing a calibration method for a telecentric imaging 3D shape measurement system. This new technique solves the problems that affect the precision of the 3D shape measurement. For example, the calibration process of the existing 3D shape measurement systems are complex, and partial parameters of these systems are very difficult to calibrate precisely. To solve the foregoing technical problems, the present invention employs a technical solution as follows:

a calibration method for a telecentric 3D shape measurement system includes the following steps:

step S1: establishing a telecentric 3D shape measurement system, and the measurement system including: a projector with bilateral telecentric lens, a camera with bilateral telecentric lens and a translation stage; letting the optical axis of the camera be vertical to the translation stage that is positioned horizontally, and an optical axis of the projector form a slant angle with the translation stage; controlling the optical axis of the camera and the optical axis of the projector to be in a same plane;

step S2: making the translation stage be in the common depth of field of the telecentric projector equipment and the telecentric camera equipment, collecting fringes by the telecentric camera equipment when the telecentric projector equipment projects sinusoidal fringe pattern to the translation stage, selecting any pixel on an imaging plane of the telecentric camera equipment as a pixel for calibration, solving an absolute phase value of the pixel by using a phase-shifting method, and recording a depth value of the translation stage at the moment;

controlling the translation stage to be different depths, which are on a direction along the optical axis of the telecentric camera equipment, and in the common depth of field of the telecentric projection equipment and the telecentric camera equipment, obtaining every absolute phase value of the pixel for calibration respectively when the translation stage is at different depths, and recording each corresponding depth value of the translation stage; and conducting linear fitting on the different depth values of the translation stage and the corresponding absolute phase values of the pixel for calibration, establishing a conversion between absolute phase values and depth values in the telecentric 3D shape measurement system; and step S3: calibrating the parameters of the telecentric camera equipment, next transforming pixel coordinates on the imaging plane of the telecentric camera equipment into world coordinates.

Based on the foregoing technical solution, the present invention may be stated in detailed as follows:

further, the step S2 includes:

step S21: controlling the translation stage in the common depth of field of the telecentric projection equipment and the telecentric camera equipment, adjusting the translation stage to be at a lowest position of the system's depth measurement range, and recording a lowest depth $z_0$ of the translation stage;

step S22: using a computer to program a sinusoidal fringe pattern with a period being $T_0$, and implanting it into the telecentric projection equipment, so that the telecentric projection equipment can project four sinusoidal fringe patterns with fixed period to the translation stage; conducting phase-shifting operation on the four sinusoidal fringe patterns, and the shifting phase values based on the first pattern are $2\pi L/4$ (L=0, 1, 2, 3); sequentially collecting the four phase-shifting fringe patterns by the telecentric camera equipment; selecting any pixel on the imaging plane of the telecentric camera equipment as a pixel for calibration, and setting the pixel coordinates of the pixel for calibration in the image coordinates system of the telecentric camera equipment as (μ, v); an expression of light intensity of the pixel for calibration $I_L(\mu, v)$ is:

$$I_L(\mu, v) = a(u, v) + b(\mu, v)\cos\left[\varphi(\mu, v) + \frac{2\pi L}{4}\right] \quad (1)$$

wherein L=0, 1, 2, 3, $a(\mu, v)$ is background intensity, $b(\mu, v)$ is the intensity modulation, and $\varphi(\mu, v)$ is the Lth absolute phase value of the pixel (μ, v) for calibration;

according to a four-step phase-shifting method, a wrapped phase $\phi(\mu, v)$ of the pixel for calibration (μ, v) can be calculated as:

$$\phi(\mu, v) = \arctan\left[\frac{\sum_{L=0}^{3} I_L(\mu, v)\sin\frac{2\pi L}{4}}{\sum_{L=0}^{3} I_L(\mu, v)\cos\frac{2\pi L}{4}}\right] \quad (2)$$

since the wrapped phase value is cut off between $[-\pi, \pi]$, phase-unwrapping is needed in order to obtain the absolute phase value $\varphi(\mu, v)$ of the pixel $(\mu, v)$ for calibration, as:

$$\varphi(\mu, v) = \phi(\mu, v) + 2k(\mu, v)\pi \quad (3)$$

wherein $k(\mu, v) = \pm 1$;

step S23: making the translation stage to be in the common depth of field of the telecentric projector equipment and the telecentric camera equipment, controlling the translation stage to move upwards along the optical axis of the telecentric camera equipment and the moving interval is $\Delta z$, so that the translation stage is located at series of different depths: $Z_j = Z_0 + j\Delta Z$ ($j=0, 1, 2, \ldots, n$), and respectively calculating the different absolute phase values $\varphi_{Zj}(\mu, v)$ ($j=0, 1, 2, \ldots, n$) of the pixel $(\mu, v)$ for calibration when the translation stage is at different depth $Z_j$ ($j=0, 1, 2, \ldots, n$) according to the method in step S22; and step S24: conducting linear fitting by using the different depths $Z_j$ ($j=0, 1, 2, \ldots, n$) of the translation stage and the corresponding absolute phase values $\varphi_{Zj}(\mu, v)$ ($j=0, 1, 2, \ldots, n$) of the pixel $(\mu, v)$ for calibration; and obtaining the linear phase-depth conversion in the telecentric 3D shape measurement system:

$$Z = M\varphi(\mu, v) + b(\mu, v) \quad (4)$$

wherein M is a linear scale factor.

further, step S3 includes:

step S31: adjusting the translation stage to be at a depth that imaging most clearly in the common depth of field of the telecentric projection and camera equipment, placing a calibration target on the translation stage, letting the telecentric projector equipment project white light to the calibration target, and collecting the calibration target image by the telecentric camera equipment; extracting feature points of the calibration target to obtain series of world coordinates $(X_{\omega i}, Y_{\omega i}, Z_{\omega i})$ ($i=1, 2, \ldots, N$, N is the total number of feature points) in the world coordinates system and their corresponding series of pixel coordinates $(\mu_i, v_i)$ ($i=1, 2, \ldots, N$) in the imaging plane of the telecentric camera equipment; and step S32: calibrating parameters of the telecentric camera equipment by using the world coordinates $(X_{\omega i}, Y_{\omega i}, Z_{\omega i})$ ($i=1, 2, \ldots, N$) and the pixel coordinates $(\mu_i, v_i)$ ($i=1, 2, \ldots, N$) of the feature points of the calibration target; because the world coordinates $Z_{\omega i}$ ($i=1, 2, \ldots, N$) are calibrated in step S2, and it will not affect the imaging position of the world coordinates $(X_{\omega i}, Y_{\omega i})$ ($i=1, 2, \ldots, N$) in the telecentric camera equipment, $Z_{\omega i}$ ($i=1, 2, \ldots, N$) can be omitted eventually in the process of camera parameters calibration; finally use the calibration results to transform the pixel coordinates $(\mu, v)$ into the world coordinates $(X_\omega, Y_\omega)$ to finish 3D shape measurement.

further, the step S32 specifically includes:

step S321: building an orthographic transformation model for the bilateral telecentric lens when imaging without consideration of lens distortions; the orthographic transformation model being:

$$\begin{bmatrix} x_{\mu i} \\ y_{\mu i} \\ 1 \end{bmatrix} = \begin{bmatrix} \frac{m}{d\mu} & 0 & 0 \\ 0 & \frac{m}{dv} & 0 \\ 0 & 0 & 1 \end{bmatrix} \begin{bmatrix} r_{11} & r_{12} & r_{13} & t_x \\ r_{21} & r_{22} & r_{23} & t_y \\ 0 & 0 & 0 & 1 \end{bmatrix} \begin{bmatrix} X_{\omega i} \\ Y_{\omega i} \\ Z_{\omega i} \\ 1 \end{bmatrix} \quad (5)$$

wherein, $(x_{\mu i}, y_{\mu i})$ ($i=1, 2, \ldots, N$) are image coordinates of a series of feature points of the calibration target in the imaging plane of the telecentric camera equipment, $(X_{\omega i}, Y_{\omega i}, Z_{\omega i})$ ($i=1, 2, \ldots, N$) are the world coordinates of a series of the corresponding feature points in the world coordinates system, m is the magnification of the bilateral telecentric lens of the telecentric camera equipment, $R=[r_{cd}]$ ($c=1, 2$; $d=1, 2, 3$) is a rotation matrix, $T=[t_x t_y]^T$ is a translation matrix, $d\mu$ and $dv$ are physical sizes of each pixel on x axis and y axis directions respectively;

in a situation of not considering lens distortions, a relation between the pixel coordinates on the image plane of the telecentric camera equipment and the image coordinates on the imaging plane of the telecentric camera equipment is:

$$\begin{bmatrix} (\mu_i - \mu_0) & d\mu \\ (v_i - v_0) & dv \end{bmatrix} = \begin{bmatrix} x_{\mu i} \\ y_{\mu i} \end{bmatrix} \quad (6)$$

wherein $(\mu_0, v_0)$ is a central pixel coordinate on the imaging plane of the telecentric camera equipment, and it is also an original point of the physical coordinates on the imaging plane;

step S322: considering the lens distortions of the telecentric camera equipment, an expression of the lens distortions here being:

$$\begin{bmatrix} \delta_{x_i} \\ \delta_{y_i} \end{bmatrix} = \begin{bmatrix} k_1 x_{\mu i}(x_{\mu i}^2 + y_{\mu i}^2) + h_1(3x_{\mu i}^2 + y_{\mu i}^2) + 2h_2 x_{\mu i} y_{\mu i} + s_1(x_{\mu i}^2 + y_{\mu i}^2) \\ k_1 y_{\mu i}(x_{\mu i}^2 + y_{\mu i}^2) + 2h_1 x_{\mu i} y_{\mu i} + h_2(x_{\mu i}^2 + 3y_{\mu i}^2) + s_2(x_{\mu i}^2 + y_{\mu i}^2) \end{bmatrix} \quad (7)$$

wherein $\delta_{x_i}$ ($i=1, 2, \ldots, N$) is a distortion parameter in x axis direction, $\delta_{y_i}$ ($i=1, 2, \ldots, N$) is a distortion parameter in y axis direction; $k_1$ is a degree of radial distortion, $h_1$ and $h_2$ are degrees of centrifugal distortion, $s_1$ and $s_2$ are degrees of thin prism distortion;

establishing the relation between the pixel coordinates $(\mu_i, v_i)$ ($i=1, 2, \ldots, N$) and the corresponding physical coordinates $(x_{\mu i}, y_{\mu i})$ ($i=1, 2, \ldots, N$) on the imaging plane of the telecentric camera equipment:

$$\begin{bmatrix} (\mu_i - \mu_0) & d\mu \\ (v_i - v_0) & dv \end{bmatrix} = \begin{bmatrix} x_{\mu i} \\ y_{\mu i} \end{bmatrix} + \begin{bmatrix} \delta_{x_i} \\ \delta_{y_i} \end{bmatrix} \quad (8)$$

wherein $(\mu_0, v_0)$ is a central pixel coordinate on the image plane of the telecentric camera equipment, and is also an original point of the image coordinate on the imaging plane;

step S323: the parameters of the telecentric camera equipment comprising external parameters such as rotation matrix R, translation matrix T and an initial value of magnification m of the bilateral telecentric lens;

calculating the initial values of the external parameters R and T of the telecentric camera equipment and the magnification m of the bilateral telecentric lens according to formulas (5) and (6) in the situation of not considering distortions, by using the world coordinates $(X_{\omega i}, Y_{\omega i}, Z_{\omega i})$ (i=1, 2, ..., N) of the series of feature points of the calibration target and the corresponding pixel coordinates $(\mu_i, \nu_i)$ (i=1, 2, ..., N);

substituting the pixel coordinates represented by the image coordinates in the formula (8) into the formula (5) to calculate initial values of the internal parameters $k_1$, $h_1$, $h_2$, $s_1$ and $s_2$ of the telecentric camera equipment;

obtaining the world coordinates $(\hat{X}_{\omega i}, \hat{Y}_{\omega i}, \hat{Z}_{\omega i})$ (i=1, 2, ..., N) of the series of feature points, after consideration of lens distortions, via reverse calculation according to the initial values of the internal and external parameters of the telecentric camera equipment, the initial value of the magnification m of the bilateral telecentric lens, and the pixel coordinates $(\mu_i, \nu_i)$ (i=1, 2, ..., N) of the feature points;

thus establish an objective function:

$$F = \sum_{i=1}^{N} \|(X_{\omega i}, Y_{\omega i}, Z_{\omega i}) - (\hat{X}_{\omega i}, \hat{Y}_{\omega i}, \hat{Z}_{\omega i})\|^2 \qquad (9)$$

wherein N being the total number of feature points, and the precise values of the external parameters R and T, internal parameters $k_1$, $h_1$, $h_2$, $s_1$ and $s_2$ of the telecentric camera equipment and the magnification m of the bilateral telecentric lens are obtained through a least squares method; and step S324: transforming all the pixel coordinates $(\mu, \nu)$ on the imaging plane of the telecentric camera equipment into the world coordinates $(X_\omega, Y_\omega)$ according to the external parameters R and T, the internal parameters $k_1$, $h_1$, $h_2$, $s_1$ and $s_2$ of the telecentric camera equipment and the magnification m of the bilateral telecentric lens.

The present invention, a calibration method for a telecentric 3D shape measurement system, has the advantageous effects as follows: the present invention establishes a 3D shape measurement system based on phase-shifting projection using the characteristics of the bilateral telecentric lens; in this system, both the projection equipment and the camera equipment use a bilateral telecentric lens, thus in the common depth of field of the telecentric projection equipment and the telecentric camera equipment, the projector can generate sinusoidal fringe pattern with fixed period on the translation stage, and in the depth of field of the telecentric camera equipment, the phase-depth conversion of the telecentric 3D shape measurement system may be determined by establishing a corresponding linear relation between the absolute phase value of any pixel on the imaging plane of the telecentric camera equipment and the depth of the translation stage; in the invention, only need to calibrate the linear relationship between absolute phase values and the depths of the translation stage for one pixel, therefore, the phase-depth calibration is of small complexity, high precision, good operability and strong practical applicability.

Meanwhile, the present invention, the telecentric imaging 3D shape measurement system, releases multiple restrictions on the equipments' position in the conventional 3D shape measurement system, for example: (1) the optical axis of the projector and the optical axis of the camera are not required to be strictly intersected on one point of the reference plane, as long as the optical axis $P_1P_2$ and the optical axis $C_1C_2$ are coplanar, and the camera can capture the full view of an object to be measured; (2) because the exit pupil of the projector and the entrance pupil of the camera are both located at an infinite point in the telecentric system, there is not a requirement that the connecting line between the entrance pupil of the projector and the exit pupil of the camera need to be parallel to the reference plane; and (3) this system does not make any constraint about the main point $P_2$ of the telecentric lens in the image-side of the projector and the main point $C_2$ of the telecentric lens in object-side in the camera, as long as the translation stage is in their common depth of field.

Moreover, during the process of solving the internal and external parameters of the telecentric camera equipment, an bilateral telecentric lens's orthographic transformation model is established, and all the measurement volume in the depth of field of the telecentric system can apply the internal and external parameters of the telecentric camera equipment calibrated at one depth. Thus the calibration process is simplified, and meanwhile the measurement precision is improved by employing an optimized solving method to correct parameters during the process of calibrating the parameters.

BRIEF DESCRIPTION OF THE DRAWINGS

FIG. 3 is a flowchart of a specific embodiment for step S2 according to the present invention;

FIG. 6 is a flowchart of a specific embodiment for step S3 according to the present invention;

FIG. 7 is a flowchart of a specific embodiment for step S32 according to the present invention.

Figure 1:
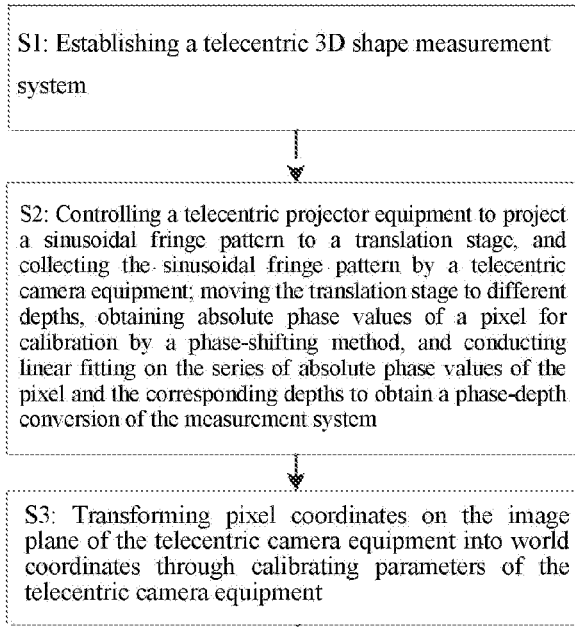
FIG. 1 is a flowchart of this calibration method for telecentric 3D shape measurement system according to the present invention.

In the drawings, the mark numbers representing practical equipments are listed as follows:

101: telecentric projection equipment, 102: telecentric camera equipment, 103: translation stage, and 104: object to be measured.

DETAILED DESCRIPTION

The present invention will be described hereinafter with reference to the drawings. The embodiments described are aimed at explaining the principles only, and they are not used to restrict the scope of the invention.

According to the calibration method for a 3D shape measurement system of the present invention, there is provided a telecentric imaging 3D shape measurement system, which enables the telecentric projection equipment to generate a sinusoidal fringe pattern with fixed period on the translation stage when the translation stage moves in the depth of field of the telecentric projection equipment; and a phase-depth map of the telecentric 3D shape measurement system may be built by calibrating the linearity between the absolute phase values of any pixel on the imaging plane of the telecentric camera equipment and the depths of the translation stage; moreover, the method establishes an orthographic transformation model for the bilateral telecentric lens, which can cover the whole depth of field of the telecentric system as long as the internal and external parameters of the telecentric camera equipment are calibrated at one depth in the depth of field, thus simplifying the calibration process.

Figure 2:
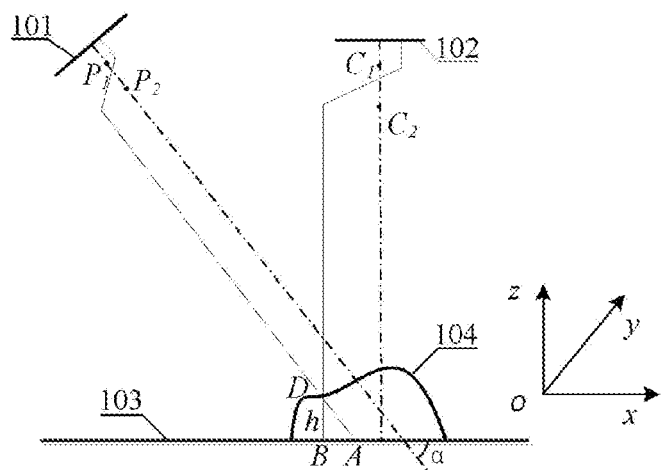
FIG. 2 is a schematic view showing equipment positions of the calibration method for telecentric 3D shape measurement system according to the present invention.

FIG. 1 is a flowchart of the calibration method for telecentric 3D shape measurement system according to the invention; FIG. 2 is a schematic view showing equipment positions of the calibration method for telecentric 3D shape measurement system according to the present invention; as shown in FIG. 1 and FIG. 2, the calibration method according to the present invention includes the following steps:

step S1: establishing a telecentric 3D shape measurement system, the measurement system including: a telecentric projection equipment 101, a telecentric camera equipment 102, and a translation stage 103; letting the optical axis of the telecentric camera equipment 102 be vertical to the translation stage 103 that is positioned horizontally, and the optical axis of the telecentric projection equipment 101 form a slant angle with the translation stage 103; and controlling the optical axis of the telecentric camera equipment 101 and the optical axis of the telecentric projection equipment 102 to be in a same plane.

Wherein, the telecentric projection equipment 101 is a digital projector using bilateral telecentric lens, and the digital projector may be a digital liquid crystal projection device (LCD projector), a digital micromirror projection device (DMD projector) or a liquid crystal on silicon projection device (LCOS projector), as long as it is convenient to generate gray scale fringe patterns by using a computer image processing system, and written the fringes into the digital projector; the telecentric camera equipment 102 is may be a camera using bilateral telecentric lenses, and the camera may be a charge coupled device, a liquid crystal device, a spatial light modulator, a CMOS device or a digital camera; when the telecentric measurement system is applied to measure the 3D information of the object 104, the object 104 to be measured is placed on the translation stage 103, which is placed horizontally and can move up and down; the translation stage 103 may be a motorized elevator stage, which is an electric stepper motor and the stepping distance can be controlled by a computer; and the translation stage 103 may also be a manually-controlled translation stage.

FIG. 2 is a schematic view showing equipment positions of the calibration method for telecentric 3D shape measurement system according to the present invention. As shown in FIG. 2, adjust the relative positions of the telecentric projection equipment 101 and the telecentric camera equipment 102, so that the translation stage 103 can be located in their common depth of field, and that structure light generated by the telecentric projection equipment 101 can be collected by the telecentric camera equipment 102. In order to simplify the schematic of FIG. 2, the principle points $P_1$ and $P_2$ of the bilateral telecentric lens of the telecentric projection equipment 101 are respectively used to illustrate projected rays. Likewise, the principle points $C_1$ and $C_2$ of the bilateral telecentric lens of the telecentric camera equipment 102 are respectively used to illustrate image formation of rays. Step S2: making the translation stage 103 is in the common depth of field of the telecentric projection equipment 101 and the telecentric camera equipment 102, controlling the telecentric projection equipment 101 to project a sinusoidal fringe pattern to the translation stage 103, collecting the sinusoidal fringe pattern by the telecentric camera equipment 102, select any pixel on the imaging plane of the telecentric camera equipment 102 as a pixel for calibration, solve the absolute phase value of the pixel by using a multi-step phase-shifting method, and recording the depth value of the translation stage 103 at the moment; controlling the translation stage 103 to be different depths, which are in the common depth of field of the telecentric projection equipment 101 and the telecentric camera equipment 102, obtaining every absolute phase value of the pixel for calibration when the translation stage 103 is at different depths, and recording corresponding depth values of the translation stage 103; and conducting linear fitting on the different depth values of the translation stage 103 and the corresponding absolute phase values of the pixel for calibration, to establish a transformation relation between absolute phase values and depth values of the translation stage 103 in the telecentric imaging 3D shape measurement system.

Figure 4:
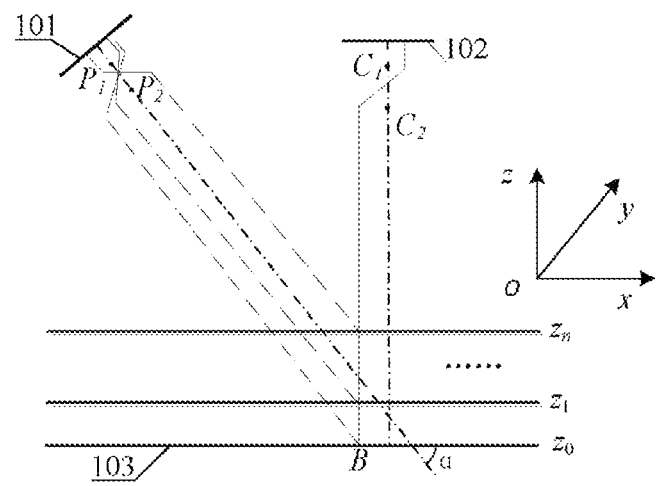
FIG. 4 is a structure diagram of controlling a translation stage to move in the system in step S23.

FIG. 3 is a flowchart of a specific embodiment for step S2 according to the present invention. As shown in FIG. 3, step S2 in the embodiment specifically includes: step S21: controlling the translation stage 103 in the common depth of field of the telecentric projection equipment 101 and the telecentric camera equipment 102, adjusting the translation stage 103 to be at the lowest position of the system's depth measurement range, and recording the lowest depth $z_0$ of the translation stage 103; step S22: using a computer to program a sinusoidal fringe pattern with a period of $T_0$, and implanting it into the telecentric projection equipment 101, so that the telecentric projection equipment 101 can project four sinusoidal fringe patterns with fixed period to the translation stage 103; conduct phase-shifting operation on the four sinusoidal fringe patterns respectively on the basis of the first sinusoidal fringe pattern, and the shifting phase values based on the first pattern are $2\pi L/4$ (L=0, 1, 2, 3); sequentially collecting the four phase-shifting fringe patterns by the telecentric camera equipment 102; selecting any pixel on the imaging plane of the telecentric camera equipment 102 as a pixel for calibration, and setting the pixel coordinates in the image coordinates system of the telecentric camera equipment 102 as $(\mu, \nu)$; the pixel $(\mu, \nu)$ is a pixel that a point (x, y) on the translation stage is imaged at the imaging plane of the camera equipment; because both the projection equipment 101 and the camera equipment 102 use bilateral lenses in the telecentric imaging 3D shape measurement system that is matched with the method of the present invention, the projection equipment can project a sinusoidal fringe pattern having a fixed period on the reference plane in the depth of field of the telecentric projection system, and the absolute phase value of the point (x, y) on the translation stage is equal to the absolute phase value at the corresponding pixel point $(\mu, \nu)$, therefore an expression of light intensity $I_L(\mu, \nu)$ of the pixel for calibration is:

$$I_L(\mu, v) = a(\mu, v) + b(\mu, v)\cos\left[\varphi(\mu, v) + \frac{2\pi L}{4}\right] \quad (1)$$

wherein L=0, 1, 2, 3, a $(\mu, \nu)$ is background intensity, b $(\mu, \nu)$ is fringe contrast, and $\varphi(\mu, \nu)$ is the Lth absolute phase value at the pixel $(\mu, \nu)$ for calibration; according to the four-step phase-shifting method, a wrapped phase $\phi$ $(\mu\nu)$ of the pixel $(\mu, \nu)$ for calibration can be calculated as:

$$\phi(\mu, v) = \arctan\left[\frac{\sum_{L=0}^{3} I_L(\mu, v)\sin\frac{2\pi L}{4}}{\sum_{L=0}^{3} I_L(\mu, v)\cos\frac{2\pi L}{4}}\right] \quad (2)$$

since the wrapped phase value is cut off between [−π, π], the wrapped phase needs a phase-unwrapping operation to obtain the absolute phase value φ (μ, ν) of the pixel (μ, ν) for calibration, as:

$$\varphi(\mu, \nu) = \phi(\mu, \nu) + 2k(\mu, \nu)\pi \quad (3)$$

wherein k(μ, ν)=±1; step S23: FIG. 4 is a structure diagrams of controlling a translation stage to move in a system in step S23; as shown in FIG. 4, making the translation stage 103 to be in the common depth of field of the telecentric projection equipment 101 and the telecentric camera equipment 102, controlling the translation stage to move upwards along the optical axis of the telecentric camera equipment 102 and the moving interval is Δz, so that the translation stage 103 is located at different depths: $Z_j = Z_0 + j\Delta Z$ (j=0, 1, 2, ..., n), and respectively calculating the absolute phase values $\varphi_{Zj}(\mu, \nu)$ (j=0, 1, 2, ..., n) of the pixel (μ, ν) for calibration when the translation stage 103 is at a depth of $Z_j$ (j=0, 1, 2, ..., n) according to the method in step S22; and step S24: conducting linear fitting by using the different depths $Z_j$ (j=0, 1, 2, ..., n) of the translation stage 103 and the corresponding absolute phase values $\varphi_{Zj}(\mu, \nu)$ (j=0, 1, 2, ..., n) of the pixel (μ, ν) for calibration; and obtaining the linear transformation relation expression between the absolute phase values and the depths in the telecentric imaging 3D shape measurement system:

$$Z = M\varphi(\mu, \nu) + b(\mu, \nu) \quad (4)$$

wherein M is a linear scale factor. Because a phase difference, what is modulated by an object depth is usually obtained in 3D shape measurement, so it only needs to pay attention to the precision of the linear scale factor M in the linear relationship.

The bilateral telecentric lens has the character of making the magnification of the image obtained not change in a certain object distance range; therefore, in the telecentric imaging 3D shape measurement system of the present invention, it only needs to work out the linear transformation relation between the absolute phase values of the pixel for calibration and the depths of translation stage in the depth of field, so that any pixel on the image plane of the telecentric camera equipment can apply this relation, finally simplifying the calibration process.

In order to express more clearly about the process of calibrating the linear relation between the absolute phase values φ (μ, ν) and the depths Z telecentric imaging 3D shape measurement system in step S2 of the present invention, the detailed implementation of the embodiment will be further described hereinafter.

The telecentric camera equipment in the embodiment uses a DaHeng industrial grade CMOS camera DH-HV1351-UC, the resolution of which is 1280*1024, and a lens of which employs a DaHeng bilateral telecentric lens GC0230105; the telecentric projection equipment uses a HP projector AX325AA, the resolution of which is 800*600, and a lens of which employs a DaHeng bilateral telecentric lens GC0230106; the translation stage is a mutually controlled translation stage which can move up and down, and its moving precision is 0.01 mm. The positions of the projector and the camera in the embodiment are placed as shown in FIG. 2, and the slant angle is kept unchanged there, and the translation stage is controlled moving vertically along the Z axis direction. The projector projects four sinusoidal fringe pattern to the translation stage, and the period of the fringes is 16 pixel. The four sinusoidal fringe patterns have a phase-shifting of 2πL/4 (L=0, 1, 2, 3) on the basis of the first sinusoidal fringe pattern. and the initial phase of the first sinusoidal fringe pattern is set as 0, then the four sinusoidal fringe patterns sequentially collected by the camera can be represented as:

$$I_L(\mu, \nu) = a(\mu, \nu) + b(\mu, \nu)\cos\left[\varphi(\mu, \nu) + \frac{2\pi L}{4}\right] \quad (1)$$

wherein, L=0, 1, 2, 3; the four sinusoidal fringe patterns with equal phase difference are projected to the translation stage at every depth, and the camera collects the four sinusoidal fringe patterns sequentially. Then the absolute phase value φ (μ, ν) of the pixel (μ, ν) on the imaging plane of the camera can be obtained at every depth Z, by using a four-step phase-shifting method.

In the embodiment, a pixel indexed as (710, 571) on the image plane of the camera is selected, and the translation stage is manually controlled to move upwards for a distance of 0.05 mm in each time. The lowest depth that can reach by the translation stage is set to be 0 mm, and the depth calibration range is 2.40 mm to 2.70 mm. The four-step phase-shifting method is used to solve the absolute phase value of the pixel indexed as (710, 571) on the image plane of the camera, and the absolute phase value and the corresponding depth of the translation stage is shown in the table below:

| | Absolute phase value (rad) | | | | | | |
|---|---|---|---|---|---|---|---|
| | 3.1733 | 3.2748 | 3.3778 | 3.4885 | 3.5884 | 3.6870 | 3.8023 |
| Depth of the translation stage (mm) | 2.40 | 2.45 | 2.50 | 2.55 | 2.60 | 2.65 | 2.70 |

Figure 5:
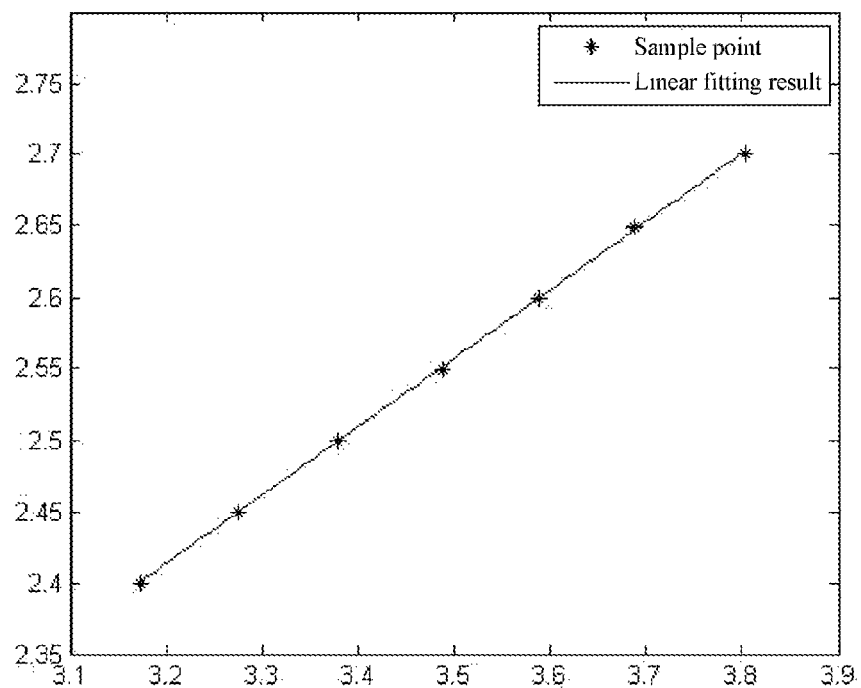
FIG. 5 is a specific embodiment for step S2 according to the present invention: the linear fitting result between the absolute phase values of one pixel and the depths value of the translation stage.

Doing linear fitting for these data, and the fitting result is shown in FIG. 5. FIG. 5 is a curve of linearly fitting for the absolute phase values and the depth values of the translation stage in the specific embodiment for step S2 according to the present invention. It is noted that the calibration depth is 2.40 mm to 2.70 mm here, this is aimed at avoiding the operation of phase-unwrapping. Actually, the depth measurement range of the telecentric imaging measurement system established in this case can be as high as 5 mm. The present invention further includes step S3, step S3: transforming the pixel coordinates on the image plane of the telecentric camera equipment into the world coordinates through calibrating parameters of the telecentric camera equipment.

FIG. 6 is a flowchart of a specific embodiment for step S3 according to the present invention. As shown in FIG. 6, the step S3 in the embodiment specifically includes:

step S31: adjusting the translation stage to be in the common depth of field of the telecentric projection equipment and the telecentric camera equipment, placing a calibration target on the translation stage, projecting white light to the calibration target by the telecentric projection equipment, and collecting a calibration target image by the telecentric camera equipment; extracting feature points of the calibration target to obtain a series of world coordinates ($X_{\omega i}$, $Y_{\omega i}$, $Z_{\omega i}$) (i=1, 2, ..., N, N is the total number of feature points) of feature points under a world coordinate system and their corresponding series of pixel coordinates ($\mu_i$, $v_i$) (i=1, 2, ..., N) of feature point imaging on the image coordinate system of the telecentric camera equipment; and step S32: calibrating parameters of the telecentric camera equipment by using the world coordinates ($X_{\omega i}$, $Y_{\omega i}$, $Z_{\omega i}$) (i=1, 2, ..., N) and the pixel coordinates ($\mu_i$, $v_i$) (i=1, 2, ..., N) of the feature points of the calibration target; because the world coordinates $Z_{\omega i}$ (i=1, 2, ..., N) are calibrated in step S2, and it will not affect the imaging position of the world coordinates ($X_{\omega i}$, $Y_{\omega i}$) (i=1, 2, ..., N) in the telecentric camera equipment, $Z_{\omega i}$ (i=1, 2, ..., N) can be omitted eventually in the process of camera parameters calibration; finally using the calibration results to transform the pixel coordinate ($\mu$, $v$) on the imaging plane of the telecentric camera equipment into the world coordinates ($X_\omega$, $Y_\omega$).

FIG. 7 is a flowchart of a specific embodiment for step S32 according to the present invention. As shown in FIG. 7, the step S3 in the embodiment specifically includes:

step S321: building an orthographic transformation model for the bilateral telecentric lens when imaging without considering lens distortions; the orthographic transformation model during the bilateral telecentric lens imaging being:

$$\begin{bmatrix} x_{\mu i} \\ y_{\mu i} \\ 1 \end{bmatrix} = \begin{bmatrix} \frac{m}{d\mu} & 0 & 0 \\ 0 & \frac{m}{dv} & 0 \\ 0 & 0 & 1 \end{bmatrix} \begin{bmatrix} r_{11} & r_{12} & r_{13} & t_x \\ r_{21} & r_{22} & r_{23} & t_y \\ 0 & 0 & 0 & 1 \end{bmatrix} \begin{bmatrix} X_{\omega i} \\ Y_{\omega i} \\ Z_{\omega i} \\ 1 \end{bmatrix} \quad (5)$$

wherein, ($x_{\omega i}$, $y_{\omega i}$) (i=1, 2, ..., N) are image coordinates of a series of feature points in the imaging plane of the telecentric camera equipment, ($X_{\omega i}$, $Y_{\omega i}$, $Z_{\omega i}$) (i=1, 2, ..., N) are the world coordinates of a series of the corresponding feature points in the world coordinates system, m is the magnification of the bilateral telecentric lens, R=[$r_{cd}$] (c=1, 2; d=1, 2, 3) is a rotation matrix, T=[$t_x t_y$]$^T$ is a translation matrix, dµ and dv are physical sizes of each pixel on x axis and y axis directions respectively; in the situation of not considering lens distortions, the relation between the pixel coordinates and the physical coordinates on the imaging plane of the telecentric camera equipment is:

$$\begin{bmatrix} (\mu_i - \mu_0) & d\mu \\ (v_i - v_0) & dv \end{bmatrix} = \begin{bmatrix} x_{\mu i} \\ y_{\mu i} \end{bmatrix} \quad (6)$$

wherein ($\mu_0$, $\sigma_0$) is the central pixel coordinates on the imaging plane of the telecentric camera equipment, and it is also the original point of the physical coordinates on the imaging plane.

Figure 8:
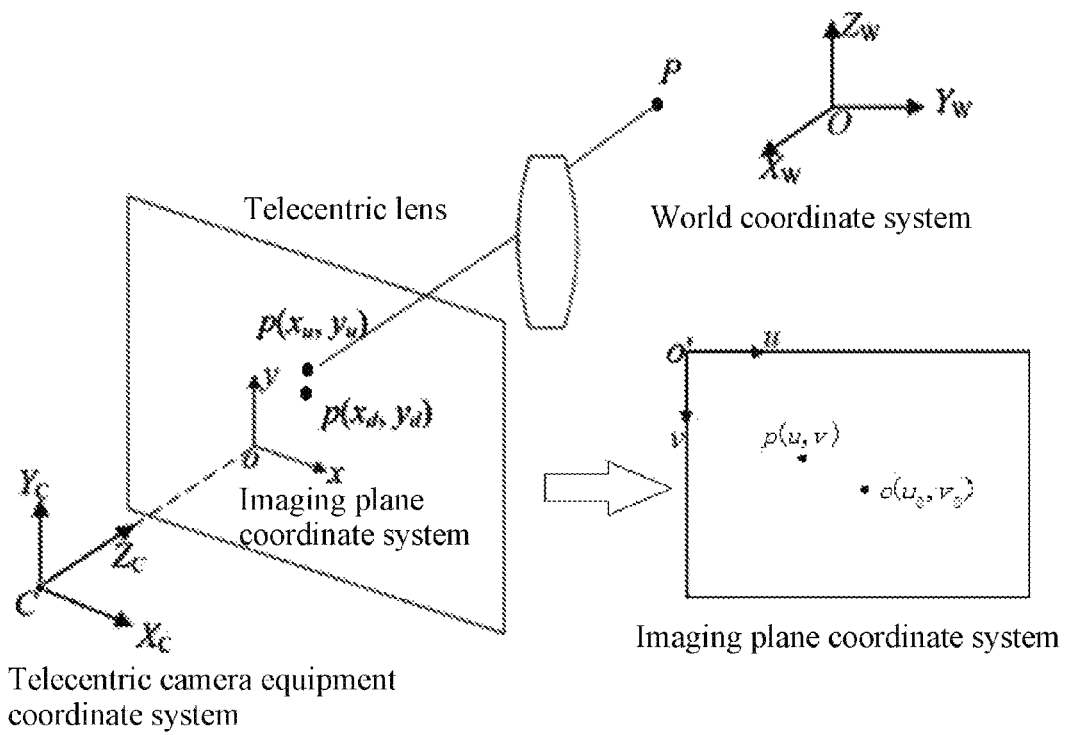
FIG. 8 is a schematic view of the imaging model of a camera having a bilateral telecentric lens.

The specific process for establishing the orthographic transformation model used in the embodiment is as follows:

FIG. 8 is a schematic view of an imaging model of camera equipment with a bilateral telecentric lens. The imaging model of the telecentric camera equipment in the embodiment is shown in FIG. 8. Set the world coordinates of a feature point P as ($X_\omega$, $Y_\omega$, $Z_\omega$), and p ($X_C$, $Y_C$, $Z_C$) as the physical coordinates of the feature point P in the telecentric camera equipment coordinates system; if it is an ideal orthogonal projection model, then the ideal physical coordinates on the imaging plane can be expressed as p ($x_\mu$, $y_\mu$); due to lens distortions, the actual physical coordinates p ($x_d$, $y_d$) differ with the ideal physical coordinates p ($x_\mu$, $y_\mu$); and ($\mu$, $v$) is the pixel coordinates on the imaging plane of the telecentric camera equipment, taking pixel as a unit.

The bilateral telecentric lens performs orthogonal projection, and without considering lens distortions, the transformation relation between the ideal (undistorted) physical coordinates of any projection point on the imaging plane and the corresponding physical coordinates under the telecentric camera system can be represented as:

$$\begin{bmatrix} x_\mu \\ y_\mu \\ 1 \end{bmatrix} = \begin{bmatrix} m & 0 & 0 & 0 \\ 0 & m & 0 & 0 \\ 0 & 0 & 0 & 1 \end{bmatrix} \begin{bmatrix} X_c \\ Y_c \\ Z_c \\ 1 \end{bmatrix} \quad (5\text{-a})$$

wherein m is the effective magnification of the bilateral telecentric lens.

A relation between the world coordinates of any projection point and the corresponding physical coordinates under the telecentric camera system is:

$$\begin{bmatrix} X_c \\ Y_c \\ Z_c \\ 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} X_w \\ Y_w \\ Z_w \\ 1 \end{bmatrix} \quad (5\text{-b})$$

Wherein, R=[$r_{cd}$] (c=1, 2; d=1, 2, 3) is a rotation matrix, and T=[$t_x t_y$]$^T$ is a translation matrix. Without consideration of distortions, an imaging plane-coordinate system xoy is consistent with the image plane coordinate system of the telecentric camera equipment; therefore, an expression of transforming the imaging plane coordinates ($x_\mu$, $y_\mu$) to the corresponding pixel coordinate ($\mu$, $v$) on the imaging plane have such relationship:

$$\begin{bmatrix} u - u_0 \\ v - v_0 \\ 1 \end{bmatrix} = \begin{bmatrix} \frac{1}{du} & 0 & 0 \\ 0 & \frac{1}{dv} & 0 \\ 0 & 0 & 1 \end{bmatrix} \begin{bmatrix} x_\mu \\ y_\mu \\ 1 \end{bmatrix} \quad (5\text{-c})$$

Wherein, dµ and dv are physical sizes of a pixel on x and y directions respectively, and ($\mu_0$, $v_0$) is the central pixel coordinates on the imaging plane of the telecentric camera equipment, and it is also the original point of the physical coordinates on the imaging plane.

With reference to formulas (5-a)-(5-c), the orthography transformation of the bilateral telecentric lens is formed and represented through the following equation:

$$\begin{bmatrix} x_\mu \\ y_\mu \\ 1 \end{bmatrix} = \begin{bmatrix} \frac{m}{du} & 0 & 0 \\ 0 & \frac{m}{dv} & 0 \\ 0 & 0 & 1 \end{bmatrix} \begin{bmatrix} r_{11} & r_{12} & r_{13} & t_x \\ r_{21} & r_{22} & r_{23} & t_y \\ 0 & 0 & 0 & 1 \end{bmatrix} \begin{bmatrix} X_\omega \\ Y_\omega \\ Z_\omega \\ 1 \end{bmatrix} \quad (5\text{-}d)$$

the formula (5-d) is namely the orthographic transformation model during bilateral telecentric lens imaging.

step S322: considering the lens distortions of the telecentric camera equipment, wherein the lens distortions mainly include three types: radical distortion, decentering distortion, and thin prism distortion; in this embodiment, only considering effective distortions, and the lens distortion expression is:

$$\begin{bmatrix} \delta_{x_i} \\ \delta_{y_i} \end{bmatrix} = \begin{bmatrix} k_1 x_{\mu i}(x_{\mu i}^2 + y_{\mu i}^2) + h_1(3x_{\mu i}^2 + y_{\mu i}^2) + 2h_2 x_{\mu i} y_{\mu i} + s_1(x_{\mu i}^2 + y_{\mu i}^2) \\ k_1 y_{\mu i}(x_{\mu i}^2 + y_{\mu i}^2) + 2h_1 x_{\mu i} y_{\mu i} + h_2(x_{\mu i}^2 + 3y_{\mu i}^2) + s_2(x_{\mu i}^2 + y_{\mu i}^2) \end{bmatrix} \quad (7)$$

Wherein, $\delta_{xi}$ (i=1, 2, ..., N) is a distortion parameter of each pixel onin x axis direction, and $\delta_{yi}$ (i=1, 2, ..., N) is a distortion parameter of each pixel on y axis direction; $k_1$ is the degree of radial distortion, $h_1$ and $h_2$ are the degree of centrifugal distortion, $s_1$ and $s_2$ are the degree of thin prism distortion; establishing the relation between the pixel coordinates ($\mu_i$, $v_i$) (i=1, 2, ..., N) and the corresponding physical coordinates ($x_{\mu i}$, $y_{\mu i}$) (i=1, 2, ..., N) on the imaging plane of the telecentric camera equipment:

$$\begin{bmatrix} (\mu_i - \mu_0) & d\mu \\ (v_i - v_0) & dv \end{bmatrix} = \begin{bmatrix} x_{\mu i} \\ y_{\mu i} \end{bmatrix} + \begin{bmatrix} \delta_{x_i} \\ \delta_{y_i} \end{bmatrix} \quad (8)$$

wherein ($\mu_0$, $v_0$) is the central pixel coordinates on the imaging plane of the telecentric camera equipment, and it is also the original point of the physical coordinates on the imaging plane;

step S323: the parameters of the telecentric camera equipment comprising initial values of external parameters such as rotation matrix R, translation matrix T and initial value of magnification m of the bilateral telecentric lens;

calculating the initial values of the external parameters R and T of the telecentric camera equipment and the magnification m of the bilateral telecentric lens according to formulas (5) and (6) in the situation of not considering distortions, by using the world coordinates ($X_{\omega i}$, $Y_{\omega i}$, $Z_{\omega i}$) (i=1, 2, ..., N) of the series of feature points of the calibration target and the corresponding pixel coordinates ($\mu_i$, $v_i$) (i=1, 2, ..., N);

substituting the pixel coordinates considered lens distortions in the formula (8) into the formula (5) to calculate initial values of internal parameters $k_1$, $h_1$, $h_2$, $s_1$ and $s_2$ of the telecentric camera equipment; obtaining the world coordinates ($\hat{X}_{\omega i}$, $\hat{Y}_{\omega i}$, $\hat{Z}_{\omega i}$) (i=1, 2, ..., N) of the series of feature points again, after consideration of lens distortions, via reverse calculation according to the initial values of the internal and external parameters of the telecentric camera equipment, the initial value of the magnification m of the bilateral telecentric lens, and the pixel coordinates ($\mu_i$, $v_i$) (i=1, 2, ..., N) of the feature points;

thus establishing an objective function:

$$F = \sum_{i=1}^{N} \left\| (X_{\omega i}, Y_{\omega i}, Z_{\omega i}) - (\hat{X}_{\omega i}, \hat{Y}_{\omega i}, \hat{Z}_{\omega i}) \right\|^2 \quad (9)$$

wherein N is the total number of feature points, the precise values of the external parameters R and T, internal parameters $k_1$, $h_1$, $h_2$, $s_1$ and $s_2$ of the telecentric camera equipment and the magnification m of the bilateral telecentric lens are obtained through a least squares method; and step S324: transforming the pixel coordinates ($\mu$, $v$) on the imaging plane of the telecentric camera equipment into the world coordinates ($X_\omega$, $Y_\omega$) according to the external parameters R and T, the internal parameters $k_1$, $h_1$, $h_2$, $s_1$ and $s_2$ of the telecentric camera equipment and the magnification m of the bilateral telecentric lens.

The implementation steps and methods above only express an embodiment of the invention, which are described specifically and in details, but it is not a limitation to the protecting scope of the invention. What is worth to mention is that any modifications and improvements out of this calibration method and telecentric system are within the protection scope of the invention.

The invention claimed is:

1. A calibration method for a telecentric imaging 3D shape measurement system, wherein the calibration method comprises the following steps of:
   step S1: establishing a telecentric 3D shape measurement system, and the measurement system including: a projector with a bilateral telecentric lens, a camera with a bilateral telecentric lens and a translation stage; letting the optical axis of the camera be vertical to the translation stage that is positioned horizontally, and an optical axis of the projector form a slant angle with the translation stage; controlling the optical axis of the camera and the optical axis of the projector to be in a same plane;
   step S2: making the translation stage be in the common depth of field of the telecentric projector equipment and the telecentric camera equipment, collecting fringes by the telecentric camera equipment when the telecentric projector equipment projects sinusoidal fringe pattern to the translation stage, selecting any pixel on an imaging plane of the telecentric camera equipment as a pixel for calibration, solving an absolute phase value of the pixel by using a phase-shifting method, and recording a depth value of the translation stage at the moment;
   controlling the translation stage to be different depths, which are on a direction along the optical axis of the telecentric camera equipment, and in the common depth of field of the telecentric projection equipment and the telecentric camera equipment, obtaining every absolute phase value of the pixel for calibration respectively when the translation stage is at different depths, and recording each corresponding depth value of the translation stage; and
   conducting linear fitting on the different depth values of the translation stage and the corresponding absolute phase values of the pixel for calibration, establishing a conversion between absolute phase values and depth values in the telecentric 3D shape measurement system; and
   step S3: transforming pixel coordinates on the image plane of the telecentric camera equipment into a world coordinate through calibrating parameters of the telecentric camera equipment, wherein the step S2 includes:

step S21: controlling the translation stage in the common depth of field of the telecentric projection equipment and the telecentric camera equipment, adjusting the translation stage to be at a lowest position of the system's depth measurement range, and recording a lowest depth $z_0$ of the translation stage;

step S22: using a computer to program a sinusoidal fringe pattern with a period of $T_0$, and implanting it into the telecentric projection equipment, so that the telecentric projection equipment can project four sinusoidal fringe patterns with fixed period to the translation stage; conducting phase-shifting operation on the four sinusoidal fringe patterns, and the shifting phase values based on the first pattern are $2\pi L/4$ (L=0, 1, 2, 3); sequentially collecting the four phase-shifting fringe patterns by the telecentric camera equipment; selecting any pixel on the imaging plane of the telecentric camera equipment as a pixel for calibration, and setting the pixel coordinates in the image coordinates system of the telecentric camera equipment as $(\mu, \nu)$; an expression of light intensity of the pixel for calibration $I_L(\mu, \nu)$ is:

$$I_L(\mu, \nu) = a(\mu, \nu) + b(\mu, \nu)\cos\left[\varphi(\mu, \nu) + \frac{2\pi L}{4}\right] \quad (1)$$

wherein L=0, 1, 2, 3, $a(\mu, \nu)$ is background intensity, $b(\mu, \nu)$ is fringe contrast, and $\varphi(\mu, \nu)$ is the Lth absolute phase value of the pixel $(\mu, \nu)$ for calibration;

according to a four-step phase-shifting method, a wrapped phase $\phi(\mu, \nu)$ of the pixel for calibration $(\mu, \nu)$ can be calculated as :

$$\phi(\mu, \nu) = \arctan\left[\frac{\sum_{L=0}^{3} I_L(\mu, \nu)\sin\frac{2\pi L}{4}}{\sum_{L=0}^{3} I_L(\mu, \nu)\cos\frac{2\pi L}{4}}\right] \quad (2)$$

since the wrapped phase value is cut off between $[-\pi, \pi]$, phase-unwrapping is needed in order to obtain the absolute phase value $\varphi(\mu, \nu)$ of the pixel $(\mu, \nu)$ for calibration, as:

$$\varphi(\mu, \nu) = \phi(\mu, \nu) + 2k(\mu, \nu)\pi \quad (3)$$

wherein $k(\mu, \nu)=\pm 1$;

step S23: making the translation stage to be in the common depth of field of the telecentric projector equipment and the telecentric camera equipment, controlling the translation stage to move upwards along the optical axis of the telecentric camera equipment and the moving interval is $\Delta z$, so that the translation stage is located at series of different depths: $Z_j=Z_0+j\Delta Z$ (j=0, 1, 2, ..., n), and respectively calculating the different absolute phase values $\varphi_{zj}(\mu, \nu)$ (j=0, 1, 2, ..., n) of the pixel $(\mu, \nu)$ for calibration when the translation stage is at different depth $Z_j$ (j=0, 1, 2, ..., n) according to the method in step S22; and step S24: conducting linear fitting by using the different depths $Z_j$ (j=0, 1, 2, ..., n) of the translation stage and the corresponding absolute phase values $\varphi_{zj}(\mu, \nu)$ (j=0, 1, 2, ..., n) of the pixel $(\mu, \nu)$ for calibration; and obtaining the linear phase-depth conversion in the telecentric 3D shape measurement system:

$$Z=M\varphi(\mu, \nu)+b(\mu, \nu) \quad (4)$$

wherein M is a linear scale factor.

2. A calibration method for a telecentric imaging 3D shape measurement system, wherein the calibration method comprises the following steps of:

step S1: establishing a telecentric 3D shape measurement system, and the measurement system including: a projector with bilateral telecentric lens, a camera with bilateral telecentric lens and a translation stage; letting the optical axis of the camera be vertical to the translation stage that is positioned horizontally, and an optical axis of the projector form a slant angle with the translation stage; controlling the optical axis of the camera and the optical axis of the projector to be in a same plane;

step S2: making the translation stage be in the common depth of field of the telecentric projector equipment and the telecentric camera equipment, collecting fringes by the telecentric camera equipment when the telecentric projector equipment projects sinusoidal fringe pattern to the translation stage, selecting any pixel on an imaging plane of the telecentric camera equipment as a pixel for calibration, solving an absolute phase value of the pixel by using a phase-shifting method, and recording a depth value of the translation stage at the moment; controlling the translation stage to be different depths, which are on a direction along the optical axis of the telecentric camera equipment, and in the common depth of field of the telecentric projection equipment and the telecentric camera equipment, obtaining every absolute phase value of the pixel for calibration respectively when the translation stage is at different depths, and recording each corresponding depth value of the translation stage; and conducting linear fitting on the different depth values of the translation stage and the corresponding absolute phase values of the pixel for calibration, establishing a conversion between absolute phase values and depth values in the telecentric 3D shape measurement system; and step S3: transforming pixel coordinates on the image plane of the telecentric camera equipment into a world coordinate through calibrating parameters of the telecentric camera equipment, wherein the step S3 includes:

step S31: adjusting the translation stage to be at a depth in the common depth of field of the telecentric projection and camera equipment, placing a calibration target on the translation stage, letting the telecentric projector equipment project white light to the calibration target, and collecting the calibration target image by the telecentric camera equipment extracting feature points of the calibration target to obtain series of world coordinates $(X_{107\ i}, Y_{\omega i}, Z_{\omega i})$ (i=1, 2, ..., N), N is the total number of feature points) in the world coordinates system and their corresponding series of pixel coordinates $(\mu_i, \nu_i)$ (i=1, 2, ..., N) in the imaging plane of the telecentric camera equipment; and step S32: calibrating parameters of the telecentric camera equipment by using the world coordinates $(X_{107\ i}, Y_{\omega i}, Z_{\omega i})$ (i=1, 2, ..., N) and the pixel coordinates $(\mu_i, \nu_i)$ (i=1, 2, ..., N) of the feature points of the calibration target transform the pixel coordinates $(\mu, \nu)$ into the world coordinates $(X_{107}, Y_{107})$, wherein the step S32 includes:

step S321: building an orthographic transformation model during the bilateral telecentric lens imaging without consideration of lens distortions; the orthographic transformation model being:

$$\begin{bmatrix} x_{\mu i} \\ y_{\mu i} \\ 1 \end{bmatrix} = \begin{bmatrix} \frac{m}{du} & 0 & 0 \\ 0 & \frac{m}{dv} & 0 \\ 0 & 0 & 1 \end{bmatrix} \begin{bmatrix} r_{11} & r_{12} & r_{13} & t_x \\ r_{21} & r_{22} & r_{23} & t_y \\ 0 & 0 & 0 & 1 \end{bmatrix} \begin{bmatrix} X_{\omega i} \\ Y_{\omega i} \\ Z_{\omega i} \\ 1 \end{bmatrix} \quad (5)$$

wherein, $(x_{\mu i}, y_{\mu i})$ (i=1, 2, ... , N) are image coordinates of a series of feature points of the calibration target in the imaging plane of the telecentric camera equipment, $(X_{107\ i}, Y_{107\ i}, Z_{107\ i})$ (i=1, 2, ..., N) are the world coordinates of a series of the corresponding feature points in the world coordinates system, m is the magnification of the bilateral telecentric lens of the telecentric camera equipment, $R=[r_{cd}]$ (c=1, 2; d=1, 2, 3) is a rotation matrix, $T=[t_x\ t_y]^T$ is a translation matrix, dµ and dv are physical sizes of each pixel on x axis and y axis directions respectively;

in a situation of not considering lens distortions, a relation between the pixel coordinates and the physical coordinates on the imaging plane of the telecentric camera equipment being:

$$\begin{bmatrix} (\mu_i - \mu_0) & d\mu \\ (v_i - v_0) & dv \end{bmatrix} = \begin{bmatrix} x_{\mu i} \\ y_{\mu i} \end{bmatrix} \quad (6)$$

wherein $(\mu_0, v_0)$ is a central pixel coordinate on the imaging plane of the telecentric camera equipment, and it is also an original point of the image coordinates on the imaging plane;

step S322: considering the lens distortions of the telecentric camera equipment, an expression of the lens distortions here being:

$$\begin{bmatrix} \delta_{x_i} \\ \delta_{y_i} \end{bmatrix} = \begin{bmatrix} k_1 x_{\mu i}(x_{\mu i}^2 + y_{\mu i}^2) + h_1(3x_{\mu i}^2 + y_{\mu i}^2) + 2h_2 x_{\mu i} y_{\mu i} + s_1(x_{\mu i}^2 + y_{\mu i}^2) \\ k_1 y_\mu(x_{\mu i}^2 + y_{\mu i}^2) + 2h_1 x_{\mu i} y_{\mu i} + h_2(x_{\mu i}^2 + 3y_{\mu i}^2) + s_2(x_{\mu i}^2 + y_{\mu i}^2) \end{bmatrix} \quad (7)$$

wherein $\delta_{xi}$, (i=1, 2, ... , N) is a distortion parameter in x axis direction, $\delta_{yi}$, (i=1, 2, ... , N) is a distortion parameter in y axis direction; $k_1$ is a degree of radial distortion, $h_1$ and $h_2$ are degrees of centrifugal distortion, $s_1$ and $s_2$ are the degree of thin prism distortion; establishing the relation between the pixel coordinates $(\mu_i, v_i)$ (i=1, 2, ... , N) and the corresponding physical coordinates $(x_{ui}, y_{ui})$ (i=1, 2, ... , N) on the imaging plane of the telecentric camera equipment:

$$\begin{bmatrix} (\mu_i - \mu_0) & d\mu \\ (v_i - v_0) & dv \end{bmatrix} = \begin{bmatrix} x_{\mu i} \\ y_{\mu i} \end{bmatrix} + \begin{bmatrix} \delta_{x_i} \\ \delta_{y_i} \end{bmatrix} \quad (8)$$

wherein $(\mu_0, v_0)$ is a central pixel coordinate on the image plane of the telecentric camera equipment, and is also an original point of the image coordinate on the imaging plane;

step S323: the parameters of the telecentric camera equipment comprising external parameters such as rotation matrix R, translation matrix T and an initial value of magnification m of the bilateral telecentric lens;

calculating the initial values of the external parameters R and T of the telecentric camera equipment and the magnification m of the bilateral telecentric lens according to formulas (5) and (6) in the situation of not considering distortions, by using the world coordinates $(X_{\omega i}, Y_{\omega i}, Z_{\omega i})$ (i=1, 2, ... , N) of the series of feature points of the calibration target and the corresponding pixel coordinates $(\mu_i, v_i)$ (i=1, 2, ... , N);

substituting the pixel coordinates represented by the image coordinate in the formula (8) into the formula (5) to calculate initial values of the internal parameters $k_1$, $h_1$, $h_2$, $s_1$ and $s_2$ of the telecentric camera equipment;

obtaining the world coordinates $(\hat{X}_{\omega i}, \hat{Y}_{\omega i}, \hat{Z}_{\omega i})$ (i=1, 2, ... , N) of the series of feature points, after consideration of lens distortions, via reverse calculation according to the initial values of the internal and external parameters of the telecentric camera equipment, the initial value of the magnification m of the bilateral telecentric lens, and the pixel coordinates $(\mu_i, v_i)$ (i=1, 2, ... , N) of the feature points;

thus establish an objective function:

$$F = \sum_{i=1}^{N} \left\| (X_{\omega i}, Y_{\omega i}, Z_{\omega i}) - (\hat{X}_{\omega i}, \hat{Y}_{\omega i}, \hat{Z}_{\omega i}) \right\|^2 \quad (9)$$

wherein N being the total number of feature points, the precise values of the external parameters R and T, internal parameters $k_1$, $h_1$, $h_2$, $s_1$ and $s_2$ of the telecentric camera equipment and the magnification m of the bilateral telecentric lens are obtained through a least squares method; and step S324: transforming all the pixel coordinates $(\mu, v)$ on the imaging plane of the telecentric camera equipment into the world coordinates $(X_{107}, Y_\omega)$ according to the external parameters R and T, the internal parameters $k_1$, $h_1$, $h_2$, $s_1$ and $s_2$ of the telecentric camera equipment and the magnification m of the bilateral telecentric lens.

* * * * *